United States Patent
Niwa et al.

(10) Patent No.: US 11,851,766 B2
(45) Date of Patent: Dec. 26, 2023

(54) CHEMICAL CONVERSION TREATMENT LIQUID AND PRODUCTION METHOD FOR MEMBER HAVING SURFACE PROVIDED WITH CHEMICAL CONVERSION FILM

(71) Applicant: YUKEN INDUSTRY CO., LTD., Kariya (JP)

(72) Inventors: Tsukasa Niwa, Kariya (JP); Masayuki Ooguchi, Kariya (JP); Yoshiki Hiramatsu, Kariya (JP)

(73) Assignee: YUKEN INDUSTRY CO., LTD.

( * ) Notice: Subject to any disclaimer, the term of this patent is extended or adjusted under 35 U.S.C. 154(b) by 0 days.

(21) Appl. No.: 17/907,237

(22) PCT Filed: Dec. 8, 2021

(86) PCT No.: PCT/JP2021/045086
§ 371 (c)(1),
(2) Date: Sep. 23, 2022

(87) PCT Pub. No.: WO2022/209019
PCT Pub. Date: Oct. 6, 2022

(65) Prior Publication Data
US 2023/0144193 A1  May 11, 2023

(30) Foreign Application Priority Data

Mar. 31, 2021 (JP) ................... 2021-059862

(51) Int. Cl.
*C23C 22/53* (2006.01)
*C23C 22/82* (2006.01)

(52) U.S. Cl.
CPC ............. *C23C 22/53* (2013.01); *C23C 22/82* (2013.01)

(58) Field of Classification Search
None
See application file for complete search history.

(56) References Cited

U.S. PATENT DOCUMENTS

2017/0009363 A1* 1/2017 Hiramatsu ............... C25D 5/48

FOREIGN PATENT DOCUMENTS

| EP | 3045563 B1 | 6/2017 |
|---|---|---|
| JP | 2002-194559 A | 7/2002 |
| JP | 2002-226981 A | 8/2002 |
| JP | 2005-281852 A | 10/2005 |
| JP | 2010-196174 A | 9/2010 |
| JP | 2014-159627 A | 9/2014 |
| JP | 2016-132785 A | 7/2016 |
| JP | 6085831 B1 | 3/2017 |
| JP | 6868313 B1 | 5/2021 |
| WO | 2012/137677 A1 | 10/2012 |
| WO | 2019/219403 A1 | 11/2019 |
| WO | 2022/024831 A1 | 2/2022 |

OTHER PUBLICATIONS

International Search Report and Written Opinion, International Patent Application No. PCT/JP/2021/045086, dated Dec. 8, 2021 (10 pages).
Decision to Grant, Japanese Patent Application No. 2022-542204, dated Jul. 25, 2022, with English translation (6 pages).
Office Action issued in Chinese Patent Application No. 202180026106.7, dated Apr. 29, 2023, with machine translation (10 pages).
Office Action issued in Mexican Patent Application No. MX/a/2022/011781, dated Mar. 1, 2023, with English translation (6 pages), D2 reference corresponding to D1 reference EP 3045563.
Office Action issued in European Patent Application No. 21930591.9, dated Aug. 30, 2023 (4 pages).
Extended European Search Report issued in European Patent Application No. 21930591.9, dated Aug. 18, 2023 (4 pages).

* cited by examiner

*Primary Examiner* — Shamim Ahmed
*Assistant Examiner* — Bradford M Gates
(74) *Attorney, Agent, or Firm* — Hamre, Schumann, Mueller & Larson, P.C.

(57) ABSTRACT

The chemical conversion treatment liquid according to the present invention, which is cobalt-free and is capable of forming a chemical conversion film having excellent corrosion resistance, contains a water-soluble trivalent chromium-containing substance, a water-soluble titanium-containing substance, and a water-soluble lactic acid-containing substance as essential components and may optionally contain a component at least a part of which is any of a water-soluble glycolic acid-containing substance and a water-soluble ineffective organic acid-containing substance. The water-soluble ineffective organic acid-containing substance is a water-soluble organic acid-containing substance based on an ineffective organic acid that is an organic acid other than lactic acid and other than glycolic acid. When the chemical conversion treatment liquid does not contain the water-soluble glycolic acid-containing substance and does not contain the water-soluble ineffective organic acid-containing substance, a titanium-equivalent molar concentration $C_{Ti}$ of the water-soluble titanium-containing substance, a chromium-equivalent molar concentration $C_{Cr}$ of the water-soluble trivalent chromium-containing substance, and a lactic acid-equivalent molar concentration $C_{Lc}$ of the water-soluble lactic acid-containing substance satisfy the following Expressions (1) to (3):

$$C_{Ti}/C_{Cr} \geq 0.5 \quad (1);$$

$$C_{Lc}/(C_{Ti}+C_{Cr}) \geq 0.40 \quad (2); \text{ and}$$

$$C_{Lc}/C_{Ti} \leq 2.6 \quad (3).$$

5 Claims, No Drawings

CHEMICAL CONVERSION TREATMENT LIQUID AND PRODUCTION METHOD FOR MEMBER HAVING SURFACE PROVIDED WITH CHEMICAL CONVERSION FILM

TECHNICAL FIELD

The present invention relates to a composition for chemical conversion treatment (chemical conversion treatment liquid) that is cobalt-free, i.e., substantially free from water-soluble cobalt-containing substances and that can form a chemical conversion film excellent in the corrosion resistance with consideration for environmental preservation, and relates also to a production method for a member having a surface provided with a chemical conversion film formed by using the chemical conversion treatment liquid.

BACKGROUND ART

In recent years, according to directives for environmental protection, such as RoHS (Restriction of the Use of Certain Hazardous Substances in Electrical and Electronic Equipment) directive and ELV (End of Life Vehicles) directive, it has been required to restrict the use of harmful substances (such as lead, mercury, cadmium, and hexavalent chromium).

In response to this flow, chromate films effective as chemical conversion films for anticorrosion of a member having a surface at least a part of which is composed of a metal-based material (referred to as a "metal-based surface," hereinafter), such as a zinc-plated member, have been formed through the use of a chemical conversion treatment liquid that contains trivalent chromium rather than the use of a composition for chemical conversion treatment using a chromate salt that contains hexavalent chromium (a composition for chemical conversion treatment is also referred to as a "chemical conversion treatment liquid," here and hereinafter). The chemical conversion film obtained using a conventional hexavalent chromium-containing chemical conversion treatment liquid contains soluble hexavalent chromium in the film. Therefore, such a film is a target of restriction according to the above directives.

The chemical conversion treatment liquid containing trivalent chromium may contain a water-soluble cobalt-containing substance in order to improve the corrosion resistance (e.g., Patent Document 1).

PRIOR ART DOCUMENTS

Patent Documents

[Patent Document 1] JP2010-196174A

DISCLOSURE OF THE INVENTION

Problems to be Solved by the Invention

Cobalt, which is a metal related to a water-soluble cobalt-containing substance, is a kind of so-called rare metal, and it may be difficult to obtain cobalt stably at low cost. Moreover, some of the highly stably available cobalt-containing compounds (cobalt chloride, cobalt carbonate, cobalt nitrate, and cobalt sulfate) belong to substances of very high concern (SVHC), and there are movements in many companies to limit the use of these substances. Therefore, a trivalent chromium-containing chemical conversion treatment liquid that is substantially free from a water-soluble cobalt-containing substance may be required.

Furthermore, also for a chemical conversion film formed from a chemical conversion treatment liquid, it cannot be said that excessive dissolution of a metal-based component contained in the film during the use is preferred unless the possibility of an adverse effect of the metal-based component on the environment is denied. Thus, even when a certain chemical conversion film has excellent corrosion resistance, if the excellent corrosion resistance is brought about by the excessive dissolution of a metal-based component from the chemical conversion film, it may not be appropriate to include a water-soluble metal-containing substance giving the metal-based component in the chemical conversion treatment liquid in consideration of the influence on the environment.

In view of such circumstances, an object of the present invention is to provide a cobalt-free trivalent chromium-containing chemical conversion treatment liquid that is substantially free from water-soluble cobalt-containing substances, i.e., does not contain water-soluble cobalt-containing substances to such an extent that they function as effective components in the formation of a chemical conversion film and that can form a chemical conversion film excellent in the corrosion resistance with consideration for environmental preservation. Another object of the present invention is to provide a production method for a member having a surface provided with a chemical conversion film formed by using the chemical conversion treatment liquid.

Means for Solving the Problems

As a result of studies to solve the above problems, the present inventors have obtained the following findings. That is, in a chemical conversion treatment liquid containing trivalent chromium, by containing a water-soluble trivalent chromium-containing substance, a water-soluble titanium-containing substance, and a water-soluble lactic acid-containing substance so that these substances satisfy predetermined relationships, a chemical conversion treatment liquid having excellent stability can be obtained, and a chemical conversion film having excellent corrosion resistance can be formed from the chemical conversion treatment liquid.

The present invention accomplished based on the above findings is as follows.

(1) A chemical conversion treatment liquid that is cobalt-free and contains a water-soluble trivalent chromium-containing substance, a water-soluble titanium-containing substance, and a water-soluble lactic acid-containing substance as essential components, the chemical conversion treatment liquid optionally containing a component at least a part of which is any of a water-soluble glycolic acid-containing substance and a water-soluble ineffective organic acid-containing substance, the water-soluble ineffective organic acid-containing substance being a water-soluble organic acid-containing substance based on an ineffective organic acid that is an organic acid other than lactic acid and other than glycolic acid, wherein (I) when the chemical conversion treatment liquid does not contain the water-soluble glycolic acid-containing substance and does not contain the water-soluble ineffective organic acid-containing substance, a titanium-equivalent molar concentration $C_{Ti}$ of the water-soluble titanium-containing substance, a chromium-equivalent molar concentration $C_{Cr}$ of the water-soluble trivalent chromium-containing substance, and a lactic acid-equivalent molar concentration CLc of the water-soluble lactic acid-containing substance satisfy following Expressions (1) to (3):

$$CTi/CCr \geq 0.5 \tag{1}$$

$$CLc/(CTi+CCr) \geq 0.40 \tag{2); and}$$

$$CLc/CTi \leq 2.6 \tag{3},$$

wherein (II) when the chemical conversion treatment liquid contains the water-soluble glycolic acid-containing substance and does not contain the water-soluble ineffective organic acid-containing substance,
the above Expressions (1) and (3) and a following Expression (2A) are satisfied:

$$(CLc-\alpha \times CGy)/(CTi+CCr) \geq 0.40 \tag{2A},$$

where CGy represents a glycolic acid-equivalent molar concentration of the water-soluble glycolic acid-containing substance and α represents a correction coefficient of 0.4,
wherein (III) when the chemical conversion treatment liquid does not contain the water-soluble glycolic acid-containing substance and contains the water-soluble ineffective organic acid-containing substance,
the above Expressions (1) to (3) and a following Expression (4) are satisfied:

$$0 < CCa/CLc \leq 0.175 \tag{4}$$

where CCa represents an organic acid-equivalent molar concentration of the water-soluble ineffective organic acid-containing substance,
wherein (IV) when the chemical conversion treatment liquid contains the water-soluble glycolic acid-containing substance and contains the water-soluble ineffective organic acid-containing substance,
the above Expressions (1), (2A), (3), and (4) are satisfied.
(2) The chemical conversion treatment liquid according to the above (1), further containing one or more selected from the group consisting of a water-soluble aluminum-containing substance, a water-soluble nickel-containing substance, a water-soluble magnesium-containing substance, and water-dispersible silica.
(3) The chemical conversion treatment liquid according to the above (1) or (2), wherein the ineffective organic acid includes one or more selected from the group consisting of oxalic acid, malic acid, and citric acid.
(4) A production method for a member having a surface provided with a chemical conversion film, the production method comprising:
  a contact step of bringing the chemical conversion treatment liquid according to any one of the above (1) to (3) into contact with a base material having a metal-based surface to form a chemical conversion film on the metal-based surface of the base material; and
  a washing step of washing the base material subjected to the contact step to obtain a member having a surface provided with the chemical conversion film.
(5) The production method for the member according to the above (4), wherein the metal-based surface includes a surface of a zinc-based plating film.

Effect of the Invention

According to the present invention, a chemical conversion treatment liquid that is cobalt-free and can form a chemical conversion film excellent in the corrosion resistance with consideration for environmental preservation is provided without using a water-soluble cobalt-containing substance, which has been frequently used for forming a chemical conversion film having excellent corrosion resistance. Moreover, a production method for a member having a surface provided with a chemical conversion film formed by using the chemical conversion treatment liquid is provided.

BEST MODES FOR CARRYING OUT THE INVENTION

Hereinafter, one or more embodiments of the present invention will be described in detail.
1. Acidic Composition for Reaction-Type Chemical Conversion Treatment The composition of an acidic composition for reaction-type chemical conversion treatment (also referred to as a "chemical conversion treatment liquid" in the present specification) according to an embodiment of the present invention will be described. The chemical conversion treatment liquid according to an embodiment of the present invention is a cobalt-free chemical conversion treatment liquid that contains a water-soluble trivalent chromium-containing substance, a water-soluble titanium-containing substance, and a water-soluble lactic acid-containing substance as essential components and optionally contains a component at least a part of which is a water-soluble ineffective organic acid-containing substance. The components contained in the chemical conversion treatment liquid will be described in detail below.
(1) Water-Soluble Trivalent Chromium-Containing Substance The chemical conversion treatment liquid according to an embodiment of the present invention contains at least one type of a water-soluble trivalent chromium-containing substance. The water-soluble trivalent chromium-containing substance is a substance selected from the group consisting of trivalent chromium ($Cr^{3+}$) and a water-soluble substance that contains trivalent chromium.

It is preferred to use a water-soluble compound capable of generating the water-soluble trivalent chromium-containing substance in water (referred to as a "water-soluble trivalent chromium compound," hereinafter) as a substance to be compounded for containing the water-soluble trivalent chromium-containing substance in the chemical conversion treatment liquid, that is, a raw material substance for the water-soluble trivalent chromium-containing substance.

Examples of the water-soluble trivalent chromium compound include trivalent chromium salts, such as chromium chloride, chromium sulfate, chromium nitrate, chromium phosphate, and chromium acetate, and compounds obtained by reducing hexavalent chromium compounds, such as chromic acid and dichromate, to trivalent using a reductant. The water-soluble trivalent chromium compound may be composed only of one type of compound or may also be composed of two or more types. The chemical conversion treatment liquid according to the present embodiment is substantially free from hexavalent chromium because a hexavalent chromium compound is not positively added as a raw material to the chemical conversion treatment liquid according to the present embodiment.

From the viewpoint of improving the ease of forming the chemical conversion film, the content of the water-soluble trivalent chromium-containing substance in the chemical conversion treatment liquid according to the present embodiment is preferably 0.01 mol/L or more, more preferably 0.02 mol/L or more, and particularly preferably 0.04 mol/L or more in terms of chromium. The upper limit of the content is not particularly limited, but an unduly large content may cause problems from the viewpoints of economic performance and waste liquid treatment, and the upper limit is therefore preferably about 0.15 mol/L, more preferably about 0.12 mol/L, and particularly preferably about 0.1 mol/L in terms of chromium.

(2) Water-Soluble Titanium-Containing Substance

The chemical conversion treatment liquid according to the present embodiment contains at least one type of a water-soluble titanium-containing substance. The water-soluble titanium-containing substance is selected from the group consisting of titanium ions ($Ti^{3+}$, $Ti^{4+}$) and a water-soluble substance that contains titanium ions.

It is preferred to use a water-soluble compound capable of generating the water-soluble titanium-containing substance in water (referred to as a "water-soluble titanium compound," hereinafter) as a substance to be compounded for containing the water-soluble titanium-containing substance in the chemical conversion treatment liquid, that is, a raw material substance for the water-soluble titanium-containing substance.

Examples of the water-soluble titanium compound for use include Ti carbonate, oxide, hydroxide, nitrate, sulfate, phosphate, fluoride, fluoro acid (salt), organic acid salt, and organic complex compound. Specific examples include titanium oxide (IV) (titania), titanium nitrate, titanium sulfate (III), titanium sulfate (IV), titanium chloride (IV), titanyl sulfate $TiOSO_4$, titanium fluoride (III), titanium fluoride (IV), hexafluorotitanium acid $H_2TiF_6$, ammonium hexafluorotitanate $[(NH_4)_2TiF_6]$, titanium laurate, diisopropoxytitanium bisacetone $(C_5H_7O_2)_2Ti[OCH(CH_3)_2]_2$, and titanium acetylacetonate $Ti(OC(=CH_2)CH_2COCH_3)_3$. These may be anhydrides or hydrates. The water-soluble titanium compound preferably does not contain fluorine because it is preferred that the chemical conversion treatment liquid according to the present embodiment should be a chemical conversion treatment liquid having a low environmental load.

From the viewpoint of improving the ease of forming the chemical conversion film, the content of the water-soluble titanium-containing substance in the chemical conversion treatment liquid according to the present embodiment is preferably 0.0001 mol/L or more, more preferably 0.0005 mol/L or more, and particularly preferably 0.001 mol/L or more in terms of titanium. The upper limit of the content is not particularly limited, but an unduly large content may increase the possibility of lowering the stability of the chemical conversion treatment liquid and increase the possibility that problems occur from the viewpoints of economic performance and waste liquid treatment, and the upper limit is therefore preferably about 1 mol/L, more preferably about 0.5 mol/L, and particularly preferably about 0.1 mol/L in terms of titanium.

The chemical conversion treatment liquid according to the present embodiment satisfies the following Expression (1) from the viewpoint that the chemical conversion film formed from the chemical conversion treatment liquid has high corrosion resistance while improving the stability of the treatment liquid.

$$CTi/CCr \geq 0.5 \tag{1}$$

Here, CTi represents a titanium-equivalent molar concentration (unit: mol/L) of the water-soluble titanium-containing substance, and CCr represents a chromium-equivalent molar concentration (unit: mol/L) of the water-soluble trivalent chromium-containing substance. When the titanium-equivalent molar concentration CTi of the water-soluble titanium-containing substance is 0.5 times or more the chromium-equivalent molar concentration CCr of the water-soluble trivalent chromium-containing substance, a chemical conversion film having excellent corrosion resistance can be obtained. From the viewpoint of obtaining a chemical conversion film having excellent corrosion resistance, CTi/CCr may be preferably 0.7 or more, more preferably 1 or more, and particularly preferably 1.2 or more. From the viewpoint of corrosion resistance of the chemical conversion film, the upper limit of CTi/CCr is not set, but from the viewpoints of stability of the chemical conversion treatment liquid and economic performance by using a large amount of titanium, which is generally more expensive than chromium, CTi/CCr may be preferably 2.0 or less.

(3) Water-Soluble Lactic Acid-Containing Substance

The chemical conversion treatment liquid according to the present embodiment contains a water-soluble lactic acid-containing substance. In the present specification, the "water-soluble lactic acid-containing substance" means a compound that is composed of one or more selected from the group consisting of lactic acid and its ions, salts, derivatives, and coordination compounds and is in a state of being dissolved in the chemical conversion treatment liquid which is an aqueous composition.

It is preferred to use a water-soluble compound capable of producing lactic acid in water (referred to as a "lactic acid source," hereinafter) as a substance to be compounded for containing the water-soluble lactic acid-containing substance in the chemical conversion treatment liquid. Specific examples of the lactic acid source include lactic acid derivatives such as lactic acid ester, lactic acid, and lactate (metal salt). The lactic acid source may be lactate from the viewpoint of improving the high solubility and the ease of interaction between the generated water-soluble lactic acid-containing substance and other components contained in the chemical conversion treatment liquid. Examples of such lactates include sodium lactate and potassium lactate.

From the viewpoints of improving the ease of forming the chemical conversion film and the stability of the chemical conversion treatment liquid, the content of the water-soluble lactic acid-containing substance in the chemical conversion treatment liquid according to the present embodiment is preferably 0.001 mol/L or more, more preferably 0.004 mol/L or more, and particularly preferably 0.008 mol/L or more in terms of lactic acid. The upper limit of the content is not particularly limited, but an unduly large content may increase the possibility that problems occur from the viewpoints of corrosion resistance of the chemical conversion film, economic performance, and waste liquid treatment, and the upper limit of the content of the water-soluble lactic acid-containing substance is therefore preferably about 0.4 mol/L, more preferably about 0.2 mol/L, and particularly preferably about 0.1 mol/L.

When the chemical conversion treatment liquid according to the present embodiment does not contain a water-soluble glycolic acid-containing substance and does not contain a water-soluble ineffective organic acid-containing substance, the following Expression (2) is satisfied. The water-soluble glycolic acid-containing substance and the water-soluble ineffective organic acid-containing substance will be described later, including the definitions.

$$CLc/(CTi+CCr) \geq 0.40 \quad (2)$$

Here, CLc represents a lactic acid-equivalent molar concentration of the water-soluble lactic acid-containing substance. When the chemical conversion liquid satisfies the above Expression (2), that is, when the lactic acid-equivalent molar concentration CLc of the water-soluble lactic acid-containing substance is 0.40 times or more the total of the chromium-equivalent molar concentration CCr of the water-soluble trivalent chromium-containing substance and the titanium-equivalent molar concentration CTi of the water-soluble titanium-containing substance, the stability of the chemical conversion treatment liquid can be ensured. In the chemical conversion treatment liquid according to the present embodiment, the lactic acid is considered to interact with both the titanium ions and the trivalent chromium and to be involved in the stability of these ions in the chemical conversion treatment liquid.

The upper limit of CLc/(CTi+CCr) is preferably 3 or less and more preferably 2.5 or less from the viewpoint of particularly enhancing the corrosion resistance of the chemical conversion film.

When the chemical conversion treatment liquid according to the present embodiment does not contain the water-soluble ineffective organic acid-containing substance, the following Expression (3) is satisfied.

$$CLc/CTi \leq 2.6 \quad (3)$$

When the ratio of the lactic acid-equivalent molar concentration of the water-soluble lactic acid-containing substance to the titanium-equivalent molar concentration of the water-soluble titanium-containing substance (also referred to as a "lactic acid/titanium ratio") is 2.6 or less, a chemical conversion film having excellent corrosion resistance can be obtained. When preparing the chemical conversion treatment liquid, if the water-soluble lactic acid-containing substance and the water-soluble titanium-containing substance are used as a metal salt (tetrakislactic acid titanium (IV)), the lactic acid/titanium ratio becomes 4 and cannot be 2.6 or less. Therefore, when the lactic acid/titanium ratio is set to 2.6 or less, it may be efficient to prepare the chemical conversion treatment liquid using a titanium source (such as titanium chloride) that does not contain lactic acid.

(4) Other Water-Soluble Organic Acid-Containing Substances

The chemical conversion treatment liquid according to the present embodiment may contain a water-soluble organic acid-containing substance based on an organic acid other than the above lactic acid. Examples of such organic acids include monocarboxylic acids such as formic acid, acetic acid, and propionic acid; dicarboxylic acids such as oxalic acid, malonic acid, succinic acid, glutaric acid, adipic acid, pimelic acid, suberic acid, azelaic acid, sebacic acid, maleic acid, phthalic acid, and terephthalic acid; tricarboxylic acids such as tricarbaryl acid and aconitic acid; hydroxycarboxylic acids such as glycolic acid, malic acid, tartaric acid, citric acid, isocitric acid, and ascorbic acid; and aminocarboxylic acids such as glycine and alanine.

(4-1) Water-Soluble Glycolic Acid-Containing Substance

When the organic acid related to the water-soluble organic acid-containing substance is glycolic acid, its structure is similar to that of lactic acid, so it has a competitive relationship with lactic acid that interacts with chromium ions and titanium ions. That is, the glycolic acid acts as a masking agent for lactic acid. Therefore, when the organic acid related to the water-soluble organic acid-containing substance is glycolic acid, that is, when the chemical conversion treatment liquid according to the present embodiment contains a water-soluble glycolic acid-containing substance, the above Expression (2) is modified as in the following Expression (2A).

$$(CLc - \alpha \times CGy)/(CTi+CCr) \geq 0.40 \quad (2A)$$

Here, CGy represents a glycolic acid-equivalent molar concentration of the water-soluble glycolic acid-containing substance and α represents a correction coefficient, which is experimentally obtained as 0.4.

(4-2) Water-Soluble Ineffective Organic Acid-Containing Substance

When the chemical conversion treatment liquid according to the present embodiment contains a water-soluble ineffective organic acid-containing substance that is a water-soluble organic acid-containing substance based on an ineffective organic acid that is an organic acid other than lactic acid and other than glycolic acid, an organic acid-equivalent molar concentration CCa of the water-soluble ineffective organic acid-containing substance satisfies the following Expression (4), may preferably satisfy the following Expression (4A), and may more preferably satisfy the following Expression (4B).

$$0 < CCa/CLc \leq 0.175 \quad (4)$$

$$0 < CCa/CLc \leq 0.15 \quad (4A)$$

$$0 < CCa/CLc \leq 0.1 \quad (4B)$$

Specific examples of the ineffective organic acid include dicarboxylic acids such as oxalic acid, malonic acid, succinic acid, glutaric acid, adipic acid, pimelic acid, suberic acid, azelaic acid, sebacic acid, maleic acid, phthalic acid, and terephthalic acid; and hydroxypolycarboxylic acids such as malic acid, tartaric acid, citric acid, and isocitric acid.

The above relationships among the water-soluble trivalent chromium-containing substance, the water-soluble titanium-containing substance, and the water-soluble lactic acid-containing substance as the essential components and the water-soluble glycolic acid-containing substance and the water-soluble ineffective organic acid-containing substance as the optional components can be summarized as follows.

(I) When the water-soluble glycolic acid-containing substance is not contained and the water-soluble ineffective organic acid-containing substance is not contained, the above Expressions (1) to (3) are satisfied.

(II) When the water-soluble glycolic acid-containing substance is contained and the water-soluble ineffective organic acid-containing substance is not contained, the above Expressions (1) and (3) and the above Expression (2A) are satisfied.

(III) When the water-soluble glycolic acid-containing substance is not contained and the water-soluble ineffective organic acid-containing substance is contained, the above Expressions (1) to (3) and the above Expression (4) (preferably the above Expression (4A), more preferably the above Expression (4B)) are satisfied.

(IV) When the water-soluble glycolic acid-containing substance is contained and the water-soluble ineffective organic acid-containing substance is contained, the above Expressions (1), (2A), and (3) and the above Expression (4) (preferably the above Expression (4A), more preferably the above Expression (4B)) are satisfied.

(5) Other Components

The chemical conversion treatment liquid according to the present embodiment may contain, in addition to the above substances, one or more selected from the group consisting of water-soluble metal-containing substances related to metal elements other than the above metal elements (Cr and Ti), inorganic acid and its anion, inorganic colloid, silane coupling agent, and organic phosphorous compound. The chemical conversion treatment liquid may further contain: polyphenol, such as pyrogallol or benzenediol; corrosion inhibitor; surfactant, such as diol, triol, or amine; plastic dispersant; coloring material, such as dye, pigment, metal pigment generating agent, or other pigment generating agents; desiccant; and dispersant.

From the viewpoint of reducing the influence on the environment, the chemical conversion treatment liquid according to the present embodiment is substantially free from a water-soluble substance containing fluorine. Moreover, the chemical conversion treatment using the chemical conversion treatment liquid according to the present embodiment is reaction-type and therefore is substantially free from a film-forming organic component.

Examples of metal elements contained in the water-soluble metal-containing substances related to metal elements other than the above metal elements (Cr and Ti) include Zn, Ni, Na, K, Ag, Fe, Ca, Mg, Sc, Mn, Cu, Sn, Mo, Al, and W, which may be present in a form of hydrated ions, in a form of oxygen acid ions, such as tungstate ions, or in a form of coordination compound. Additional effects may be obtained by containing such water-soluble metal-containing substances. For example, when a water-soluble aluminum-containing substance is contained, the appearance of the obtained chemical conversion film is improved, and the dependency on base materials of the film characteristics such as the corrosion resistance and the amount of dissolved metal is lowered (specific examples of such dependency include the ease of changes of the film characteristics when the type of a bath for forming zinc-based plating is different).

The content of the above water-soluble metal-containing substance is not particularly limited. It is appropriately set in accordance with the role of the metal element contained in each water-soluble metal-containing substance. For example, in the case of a water-soluble aluminum-containing substance, it is preferably 0.0001 mol/L or more, more preferably 0.0005 mol/L or more, and particularly preferably 0.001 mol/L or more in terms of aluminum. The upper limit of the content is not particularly limited, but an unduly large content may increase the possibility of lowering the stability of the chemical conversion treatment liquid and increase the possibility that problems occur from the viewpoints of economic performance and waste liquid treatment, and the upper limit is therefore preferably about 1 mol/L, more preferably about 0.5 mol/L, and particularly preferably about 0.1 mol/L in terms of aluminum. In the case of a water-soluble nickel-containing substance, it is preferably 0.0001 mol/L or more, more preferably 0.0005 mol/L or more, and particularly preferably 0.001 mol/L or more in terms of nickel. The upper limit of the content of the water-soluble nickel-containing substance is not particularly limited, but an unduly large content may increase the possibility of lowering the stability of the chemical conversion treatment liquid and increase the possibility that problems occur from the viewpoints of economic performance and waste liquid treatment, and the upper limit is therefore preferably about 1 mol/L, more preferably about 0.5 mol/L, and particularly preferably about 0.1 mol/L in terms of nickel.

The chemical conversion treatment liquid according to the present embodiment is substantially free from a water-soluble cobalt-containing substance that is concerned about the influence on the environment. When the chemical conversion treatment liquid contains water-dispersible silica, it is preferred to use acidic silica particles. When this point is appropriately dealt with, water-dispersible silica can be contained in the chemical conversion treatment liquid within a range of 0.001 mol/L or more and 0.1 mol/L or less. When the chemical conversion treatment liquid contains water-dispersible silica containing acidic silica particles, the corrosion resistance of the obtained chemical conversion film may be enhanced.

Examples of inorganic acid include hydrohalic acid other than hydrofluoric acid, such as hydrochloric acid or hydrobromic acid, chloric acid, perchloric acid, chlorous acid, hypochlorous acid, sulfuric acid, sulfurous acid, nitric acid, nitrous acid, phosphoric acid (orthophosphoric acid), polyphosphoric acid, metaphosphoric acid, pyrophosphoric acid, ultraphosphoric acid, hypophosphorous acid, and superphosphoric acid, among which one or more selected from the group consisting of hydrohalic acid other than hydrofluoric acid, sulfuric acid, nitric acid, and phosphoric acid (orthophosphoric acid) are preferably contained as anions.

The concentration of these inorganic acids and/or inorganic acid ions in the chemical conversion treatment liquid is not particularly limited. In general, the ratio of the total molar concentration of inorganic acids and inorganic acid ions to the metal-equivalent total molar concentration of the water-soluble metal-containing substance is 0.1 or more and 10 or less and preferably 0.5 or more and 3 or less.

Examples of inorganic colloid include alumina sol, titanium sol, and zirconia sol. Examples of silane coupling agent include vinyltriethoxysilane and γ-methacryloxypropyltrimethoxysilane.

(6) Solvent and pH

The solvent of the chemical conversion treatment liquid according to the present embodiment contains water as the main component. From the viewpoints of environmental protection and treatment safety, the solvent is preferably water.

From the viewpoint of advancing the chemical conversion treatment, the chemical conversion treatment liquid according to the present embodiment is made acidic, and the pH is therefore set to less than 7. The preferred value of pH in the acidic range is not particularly limited. Considering that if the pH is unduly low, the formation of the chemical conversion film is likely to be non-uniform, while if the pH is unduly high, the stability of the chemical conversion treatment liquid is likely to deteriorate, the pH may be appropriately set. From the viewpoint of improving the quality of the chemical conversion film and the stability of the chemical conversion treatment liquid, the pH is preferably 1 or more and 5 or less, more preferably 1.5 or more and 4.5 or less, and particularly preferably 2 or more and 4 or less.

2. Concentrated Composition for Preparing Chemical Conversion Treatment Liquid

If a liquid composition having a composition in which main components of the above chemical conversion treatment liquid are concentrated about 5 to 20 times (referred to as a "concentrated liquid for chemical conversion treatment," hereinafter) is prepared, then boring work of individually adjusting the content of each component can be omitted and its storage may be easy, thus being preferred.

When the concentrated liquid for chemical conversion treatment is prepared, upper limits may be set for the contents of the above respective components with consideration for the solubility of each component.

3. Base Material to be Subjected to Chemical Conversion Treatment

The material of a base material for which the chemical conversion treatment according to the present embodiment is performed is not particularly limited, provided that it has a metal-based surface on which the chemical conversion film can be formed by using the chemical conversion treatment liquid according to the present embodiment. A preferred material is a metal-based material, and a zinc-based plated steel sheet is particularly preferred. The plating method may be electroplating or hot-dip plating. In the case of hot-dip plating, alloying treatment may be performed after the plating.

The composition of the above zinc-based plating may be pure zinc or may also be zinc alloy. In the case of zinc alloy plating, examples of metal to be alloyed include iron, nickel, and aluminum. Method of plating may be electroplating or hot-dip plating. In the case of electroplating, any of cyanide bath, chloride bath, sulfuric acid bath, and zincate bath may be used, and baking treatment may be performed after forming the plating film. In the case of hot-dip plating, alloying treatment may be performed after the plating.

4. Production Method for Member Having Surface Provided with Chemical Conversion Film The description will be directed to a production method for a member having a surface provided with the chemical conversion film formed by using the chemical conversion treatment liquid according to the present embodiment.

The production method according to the present embodiment includes a contact step of bringing the chemical conversion treatment liquid according to the present embodiment into contact with a base material having a metal-based surface to form a chemical conversion film on the metal-based surface of the base material and a washing step of washing the base material subjected to the contact step to obtain a member having a surface provided with the chemical conversion film.

In the contact step, the method of bringing the chemical conversion treatment liquid according to the present embodiment into contact with the base material having the metal-based surface is not particularly limited. The simplest method is immersion, but it may be spraying or application using a roll or the like. The contact conditions (contact temperature, contact time) are not particularly limited, and may be appropriately set in consideration of the composition of the chemical conversion treatment liquid, the composition of a material constituting the surface of the base material, productivity, etc. When the temperature of the chemical conversion treatment liquid is room temperature to about 40° C., the contact time may be sometimes about 10 seconds to 5 minutes. The chemical conversion treatment liquid according to the present embodiment is a reaction-type chemical conversion treatment liquid, and therefore the thickness of the chemical conversion film does not usually increase with time even when the time is excessively lengthened.

The base material to be subjected to the contact step is washed (e.g., degreasing and rinsing) by a known method, and activation treatment may be performed by further bringing the base material into contact with an acid aqueous solution (e.g., a nitric acid aqueous solution of about several ml/L) (about room temperature, about 10 seconds).

The base material subjected to the contact step is washed, for example, with water. This point is different from a so-called application-type chemical conversion treatment liquid, and it is a step performed because the chemical conversion treatment liquid according to the present embodiment is a reaction-type chemical conversion treatment liquid. Through such a step, the chemical conversion treatment liquid remaining on the surface of the base material subjected to the contact step is washed away, and a member having the base material and the chemical conversion film formed on the surface of the base material is obtained. For the washed member, a drying step is usually performed for the purpose of removing water adhering to the chemical conversion film and the base material. The drying conditions (drying temperature, drying time) are not particularly limited. The drying conditions are appropriately set in consideration of the heat resistance and productivity of the base material, etc. The member may be dried by leaving it in an oven maintained at a temperature of about 100° C. or lower for about 10 minutes, or may be dried using a centrifuge, or may be dried by leaving it in a normal environment. Depending on the type of chemical conversion film, a change in composition, for example, a change in a part or whole of a hydroxide to an oxide may occur during the drying.

The production method according to the present embodiment may include a finishing treatment step of performing treatment with a finishing agent for enhancing the corrosion resistance and scratch resistance to form a finished film after forming the chemical conversion film by treating the above member with the chemical conversion treatment liquid according to the present embodiment. The relationship between the finishing treatment and the drying step is arbitrary, and the finishing treatment step may be performed after the washing step and then the drying step may be performed, or the drying step may be performed after the washing step and then the finishing treatment step may be performed.

5. Method of Using Chemical Conversion Treatment Liquid

The method of using the chemical conversion treatment liquid according to the present embodiment will be described.

The method of use according to the present embodiment includes bringing the acidic composition, which is the chemical conversion treatment liquid according to the present embodiment, into contact with a base material having a metal-based surface to form a chemical conversion film on the metal-based surface of the base material.

The embodiments heretofore explained are described to facilitate understanding of the present invention and are not described to limit the present invention. Therefore, the elements disclosed in the above embodiments also include all design modifications and equivalents belonging to the technical scope of the present invention.

EXAMPLES

The effects of the present invention will be described below based on examples, but the present invention is not limited thereto.

1. Preparation of Test Members

Example 1

The chemical conversion treatment liquids listed in Tables 1 to 9 were prepared. The solvent of each chemical conversion treatment liquid is pure water.

TABLE 1

|  | 1-1 | 1-2 | 1-3 | 1-4 | 1-5 | 1-6 |
|---|---|---|---|---|---|---|
| Chromium chloride | 0.05 | 0.05 | 0.05 | 0.05 | 0.05 | 0.05 |
| Lactic acid | 0.12 | 0.12 | 0.12 | 0.12 | 0.12 | 0.05 |
| Titanium chloride | 0.07 | 0.07 | 0.07 | 0.07 | 0.07 | 0 |
| Sodium nitrate | 0.06 | 0.06 | 0.06 | 0.06 | 0.06 | 0.06 |
| Aluminum nitrate | 0 | 0.01 | 0.03 | 0.01 | 0.03 | 0.03 |
| Nickel chloride | 0.005 | 0.005 | 0.005 | 0.015 | 0.015 | 0.015 |
| $C_{Ti}/C_{Cr}$ | 1.4 | 1.4 | 1.4 | 1.4 | 1.4 | 0 |
| $C_{Lc}/(C_{Ti} + C_{Cr})$ | 1.00 | 1.00 | 1.00 | 1.00 | 1.00 | 1.00 |
| $C_{Lc}/C_{Ti}$ | 1.7 | 1.7 | 1.7 | 1.7 | 1.7 | 0.0 |
| Treatment pH | 2 | 2 | 2 | 2 | 2 | 2 |
| 5% white rust occurrence time | 600 | 600 | 720 | 384 | 720 | 168 |
| Properties of treatment liquid (precipitation) | ○ | ○ | ○ | ○ | ○ | ○ |
| Note | Example of Present Invention | Example of Present Invention | Example of Present Invention | Example of Present Invention | Example of Present Invention | Comparative Example |

TABLE 2

|  | 1-7 | 1-8 | 1-9 | 1-10 | 1-11 | 1-12 | 1-13 |
|---|---|---|---|---|---|---|---|
| Chromium chloride | 0.05 | 0.05 | 0.05 | 0.05 | 0.05 | 0.05 | 0.05 |
| Lactic acid | 0.12 | 0.12 | 0.12 | 0.12 | 0.12 | 0.12 | 0.05 |
| Titanium chloride | 0.07 | 0.07 | 0.07 | 0.07 | 0.07 | 0.07 | 0 |
| Sodium nitrate | 0.06 | 0.06 | 0.06 | 0.06 | 0.06 | 0.06 | 0.06 |
| Aluminum nitrate | 0 | 0.01 | 0.03 | 0.01 | 0.01 | 0.03 | 0.03 |
| Nickel chloride | 0.005 | 0.005 | 0.005 | 0 | 0.015 | 0.015 | 0.015 |
| $C_{Ti}/C_{Cr}$ | 1.4 | 1.4 | 1.4 | 1.4 | 1.4 | 1.4 | 0 |
| $C_{Lc}/(C_{Ti} + C_{Cr})$ | 1.00 | 1.00 | 1.00 | 1.00 | 1.00 | 1.00 | 1.00 |
| $C_{Lc}/C_{Ti}$ | 1.7 | 1.7 | 1.7 | 1.7 | 1.7 | 1.7 | 0.0 |
| Treatment pH | 3 | 3 | 3 | 3 | 3 | 3 | 3 |
| 5% white rust occurrence time | 720 | 552 | 720 | 432 | 648 | 432 | 168 |
| Properties of treatment liquid (precipitation) | ○ | ○ | ○ | ○ | ○ | ○ | ○ |
| Note | Example of Present Invention | Example of Present Invention | Example of Present Invention | Example of Present Invention | Example of Present Invention | Example of Present Invention | Comparative Example |

TABLE 3

|  | 2-1 | 2-2 | 2-3 | 2-4 | 3-1 | 3-2 | 3-3 |
|---|---|---|---|---|---|---|---|
| Chromium chloride | 0.05 | 0.05 | 0.05 | 0.05 | 0.05 | 0.07 | 0.07 |
| Lactic acid | 0.1 | 0.1 | 0.1 | 0.1 | 0.13 | 0.14 | 0.14 |
| Titanium chloride | 0.05 | 0.05 | 0.05 | 0.05 | 0.08 | 0.07 | 0.07 |
| Sodium nitrate | 0.06 | 0.06 | 0.06 | 0.06 | 0.06 | 0.06 | 0.06 |
| Aluminum nitrate | 0 | 0 | 0.005 | 0.01 | 0 | 0 | 0 |
| Nickel chloride | 0 | 0.005 | 0.005 | 0.005 | 0.005 | 0 | 0.005 |
| $C_{Ti}/C_{Cr}$ | 1 | 1 | 1 | 1 | 1.6 | 1 | 1 |
| $C_{Lc}/(C_{Ti} + C_{Cr})$ | 1.00 | 1.00 | 1.00 | 1.00 | 1.00 | 1.00 | 1.00 |
| $C_{Lc}/C_{Ti}$ | 2.0 | 2.0 | 2.0 | 2.0 | 1.6 | 2.0 | 2.0 |

TABLE 3-continued

|  | 2-1 | 2-2 | 2-3 | 2-4 | 3-1 | 3-2 | 3-3 |
|---|---|---|---|---|---|---|---|
| Treatment pH | 2 | 2 | 2 | 2 | 2 | 2 | 2 |
| 5% white rust occurrence time | 528 | 456 | 456 | 624 | 528 | 528 | 528 |
| Properties of treatment liquid (precipitation) | ○ | ○ | ○ | ○ | ○ | ○ | ○ |
| Note | Example of Present Invention | Example of Present Invention | Example of Present Invention | Example of Present Invention | Example of Present Invention | Example of Present Invention | Example of Present Invention |

TABLE 4

|  | 4-1 | 4-2 | 4-3 | 5-1 | 5-2 | 5-3 | 6-1 |
|---|---|---|---|---|---|---|---|
| Chromium chloride | 0.03 | 0.03 | 0.03 | 0.03 | 0.03 | 0.03 | 0.07 |
| Lactic acid | 0.06 | 0.06 | 0.04 | 0.03 | 0.03 | 0.06 | 0.08 |
| Glycolic acid | 0 | 0 | 0.03 | 0.03 | 0.03 | 0 | 0.07 |
| Titanium chloride | 0.03 | 0.03 | 0.04 | 0.03 | 0.03 | 0.03 | 0.08 |
| Sodium nitrate | 0.06 | 0.06 | 0.03 | 0.06 | 0.05 | 0.06 | 0.06 |
| Aluminum nitrate | 0 | 0 | 0.005 | 0 | 0.01 | 0 | 0 |
| Nickel chloride | 0.002 | 0.005 | 0 | 0 | 0 | 0 | 0 |
| $C_{Ti}/C_{Cr}$ | 1.0 | 1.0 | 1.3 | 1.0 | 1.0 | 1.0 | 1.1 |
| $C_{Lc}/(C_{Ti} + C_{Cr})$ | 1.00 | 1.00 | 0.57 | 0.50 | 0.50 | 1.00 | 0.53 |
| $C_{Lc}/C_{Ti}$ | 2.0 | 2.0 | 1.0 | 1.0 | 1.0 | 2.0 | 1.0 |
| $(C_{Lc} - \alpha C_{Gy})/(C_{Ti} + C_{Cr})$ | — | — | 0.40 | 0.30 | 0.30 | — | 0.35 |
| Treatment pH | 2 | 2 | 2 | 2 | 2 | 2 | 2 |
| 5% white rust occurrence time | 456 | 456 | 384 | 336 | 432 | 456 | 288 |
| Properties of treatment liquid (precipitation) | ○ | ○ | ○ | × | × | ○ | ○ |
| Note | Example of Present Invention | Example of Present Invention | Example of Present Invention | Comparative Example | Comparative Example | Example of Present Invention | Comparative Example |

TABLE 5

|  | 7-1 | 7-2 | 7-3 | 7-4 |
|---|---|---|---|---|
| Chromium chloride | 0.07 | 0.07 | 0.07 | 0.07 |
| Lactic acid | 0.03 | 0.03 | 0.07 | 0.03 |
| Glycolic acid | 0.07 | 0.07 | 0.07 | 0.07 |
| Titanium chloride | 0.03 | 0.03 | 0.03 | 0.03 |
| Sodium nitrate | 0.07 | 0.06 | 0.06 | 0.05 |
| Aluminum nitrate | 0 | 0.01 | 0.01 | 0.02 |
| $C_{Ti}/C_{Cr}$ | 0.4 | 0.4 | 0.4 | 0.4 |
| $C_{Lc}/(C_{Ti} + C_{Cr})$ | 0.30 | 0.30 | 0.70 | 0.30 |
| $C_{Lc}/C_{Ti}$ | 1.0 | 1.0 | 2.3 | 1.0 |
| $(C_{Lc} - \alpha C_{Gy})/(C_{Ti} + C_{Cr})$ | 0.02 | 0.02 | 0.42 | 0.02 |
| Treatment pH | 2 | 2 | 2 | 2 |
| 5% white rust occurrence time | 360 | 432 | 368 | 432 |
| Properties of treatment liquid (precipitation) | × | × | × | × |
| Note | Comparative Example | Comparative Example | Comparative Example | Comparative Example |

TABLE 6

|  | 8-1 | 8-2 | 8-3 | 8-4 | 8-5 | 8-6 | 8-7 | 8-8 |
|---|---|---|---|---|---|---|---|---|
| Chromium chloride | 0.06 | 0.06 | 0.06 | 0.06 | 0 | 0 | 0 | 0 |
| Chromium nitrate | 0 | 0 | 0 | 0 | 0.06 | 0.06 | 0.06 | 0.06 |
| Lactic acid | 0.02 | 0.04 | 0.08 | 0.015 | 0.02 | 0.04 | 0.08 | 0.015 |
| Glycolic acid | 0.06 | 0.06 | 0.06 | 0.06 | 0 | 0 | 0 | 0 |
| Titanium chloride | 0.02 | 0.04 | 0.08 | 0 | 0.02 | 0.04 | 0.08 | 0 |
| Titanyl sulfate | 0 | 0 | 0 | 0.005 | 0 | 0 | 0 | 0.005 |
| Sodium nitrate | 0.06 | 0.06 | 0.06 | 0.06 | 0 | 0 | 0 | 0 |
| Aluminum nitrate | 0.01 | 0.01 | 0.01 | 0.01 | 0.01 | 0.01 | 0.01 | 0.01 |

TABLE 6-continued

|  | 8-1 | 8-2 | 8-3 | 8-4 | 8-5 | 8-6 | 8-7 | 8-8 |
|---|---|---|---|---|---|---|---|---|
| CTi/CCr | 0.3 | 0.7 | 1.3 | 0.1 | 0.3 | 0.7 | 1.3 | 0.1 |
| CLc/(CTi + CCr) | 0.25 | 0.40 | 0.57 | 0.25 | 0.25 | 0.40 | 0.57 | 0.25 |
| CLc/CTi | 1.0 | 1.0 | 1.0 | 3.0 | 1.0 | 1.0 | 1.0 | 3.0 |
| (CLc − αCGy)/(CTi + CCr) | −0.05 | 0.16 | 0.40 | −0.14 | 0 | 0 | 0 | 0 |
| Treatment pH | 2 | 2 | 2 | 2 | 2 | 2 | 2 | 2 |
| 5% white rust occurrence time | 408 | 408 | 672 | 408 | 240 | 388 | 408 | 72 |
| Properties of treatment liquid (precipitation) | × | × | ○ | × | × | ○ | ○ | ○ |
| Note | Comparative Example | Comparative Example | Example of Present Invention | Comparative Example | Comparative Example | Example of Present Invention | Example of Present Invention | Comparative Example |

TABLE 7

|  | 9-1 | 9-2 | 9-3 | 9-4 | 9-5 | 9-6 |
|---|---|---|---|---|---|---|
| Chromium chloride | 0.05 | 0.05 | 0.05 | 0.05 | 0.05 | 0.05 |
| Lactic acid | 0.14 | 0.16 | 0.17 | 0.18 | 0.2 | 0.22 |
| Titanium chloride | 0.07 | 0.07 | 0.07 | 0.07 | 0.07 | 0.07 |
| Sodium nitrate | 0.06 | 0.06 | 0.06 | 0.06 | 0.06 | 0.06 |
| Aluminum nitrate | 0.01 | 0.01 | 0.01 | 0.01 | 0.01 | 0.01 |
| Nickel chloride | 0.005 | 0.005 | 0.005 | 0.005 | 0.005 | 0.005 |
| CTI/CCr | 1.4 | 1.4 | 1.4 | 1.4 | 1.4 | 1.4 |
| CLc/(CTi + CCr) | 1.17 | 1.33 | 1.42 | 1.50 | 1.67 | 1.83 |
| CLc/CTi | 2.00 | 2.29 | 2.43 | 2.57 | 2.86 | 3.14 |
| Treatment pH | 3 | 3 | 3 | 3 | 3 | 3 |
| 5% white rust occurrence time | 624 | 504 | 504 | 456 | 288 | 240 |
| Properties of treatment liquid (precipitation) | ○ | ○ | ○ | ○ | ○ | ○ |
| Note | Example of Present Invention | Example of Present Invention | Example of Present Invention | Example of Present Invention | Comparative Example | Comparative Example |

TABLE 8

|  | 10-1 | 10-2 | 10-3 | 10-4 |
|---|---|---|---|---|
| Chromium chloride | 0.05 | 0.05 | 0.05 | 0.05 |
| Lactic acid | 0.1 | 0.095 | 0.09 | 0.085 |
| Titanium chloride | 0.05 | 0.045 | 0.04 | 0.035 |
| Sodium nitrate | 0.06 | 0.06 | 0.06 | 0.06 |
| Aluminum nitrate | 0.01 | 0.01 | 0.01 | 0.01 |
| Nickel chloride | 0.005 | 0.005 | 0.005 | 0.005 |
| CTi/CCr | 1 | 0.9 | 0.8 | 0.7 |
| CLc/(CTi + CCr) | 1.00 | 1.00 | 1.00 | 1.00 |
| CLc/CTi | 2.00 | 2.11 | 2.25 | 2.43 |
| Treatment pH | 3 | 3 | 3 | 3 |
| 5% white rust occurrence time | 576 | 456 | 576 | 504 |
| Properties of treatment liquid (precipitation) | ○ | ○ | ○ | ○ |
| Note | Example of Present Invention | Example of Present Invention | Example of Present Invention | Example of Present Invention |

TABLE 9

|  | 11-1 | 11-2 | 11-3 | 11-4 |
|---|---|---|---|---|
| Chromium chloride | 0.05 | 0.05 | 0.05 | 0.05 |
| Lactic acid | 0.12 | 0.12 | 0.12 | 0.12 |
| Titanium chloride | 0.07 | 0.07 | 0.07 | 0.07 |
| Sodium nitrate | 0.06 | 0.06 | 0.06 | 0.06 |
| Aluminum nitrate | 0.01 | 0.01 | 0.01 | 0.01 |
| Nickel chloride | 0 | 0 | 0 | 0 |
| Magnesium | 0.005 | 0.01 | 0 | 0 |
| Colloidal silica | 0 | 0 | 0.03 | 0.1 |
| CTi/CCr | 1.4 | 1.4 | 1.4 | 1.4 |
| CLc/(CTi + CCr) | 1.00 | 1.00 | 1.00 | 1.00 |
| CLc/CTi | 1.71 | 1.71 | 1.71 | 1.71 |
| Treatment pH | 3 | 3 | 3 | 3 |
| 5% white rust occurrence time | 672 | 624 | 744 | 792 |
| Properties of treatment liquid (precipitation) | ○ | ○ | ○ | ○ |
| Note | Example of Present Invention | Example of Present Invention | Example of Present Invention | Example of Present Invention |

"Magnesium" in Table 9 was added as magnesium hydroxide. "Colloidal silica" in Table 9 is water-dispersible silica "METASU YFA-30HR" (average particle diameter D50: 10 nm) available from YUKEN INDUSTRY CO., LTD. containing acidic silica particles.

Rinsing was performed by immersing an iron flat sheet-shaped test piece (50 mm×100 mm, thickness 0.8 mm) plated with zinc of about 10 μm in pure water at 23° C. for 10 seconds while shaking the base material. Activation treatment was performed by immersing the zinc-plated base material subjected to the rinsing in a dilute nitric acid aqueous solution (3 ml/L) at 23° C. for 10 seconds while shaking the base material. Rinsing was performed by immersing the base material taken out from the dilute aqueous nitric acid solution in pure water at 23° C. for 10 seconds while shaking the base material.

Chemical conversion treatment was performed by immersing the activated base material subjected to the rinsing in any of the chemical conversion treatment liquids listed in the above Tables 1 to 9 maintained at 40° C. while shaking the base material for 40 seconds. Rinsing was performed by immersing the base material taken out from the chemical conversion treatment liquid in pure water at 23° C. for 10 seconds while shaking the base material. The chemical conversion-treated base material subjected to the rinsing was dried by leaving it in an oven maintained at 80° C. for 10 minutes. A test member having a chemical conversion film formed on the surface was thus obtained.

2. Evaluation of Test Members (1) Evaluation of Corrosion Resistance

For each of obtained test members 1-1 to 1-25, a neutral salt spray test was performed in accordance with JIS Z2371: 2000 (ISO 9227: 1990). After the test for a predetermined period (24 hours to 72 hours), an occurrence area of white rust was visually measured on the main surface of a test member, and the ratio to the area of the main surface of the test member (white rust area ratio: %) was calculated from the measurement result. When the white rust area ratio was less than 5%, the neutral salt spray test was continued, while when the white rust area ratio was 5% or more, the test was terminated and the total test time was adopted as a 5% white rust occurrence time (unit: hour).

(2) Evaluation of Properties of Chemical Conversion Treatment Liquid

The chemical conversion treatment liquid immediately after the preparation was left for 72 hours and then observed to evaluate whether or not turbidity or precipitation occurred. When it did not occur, it was evaluated as good ("○" in the tables), while when it occurred, it was evaluated as poor ("x" in the tables).

3. Results

The measurement results and evaluation results are listed in Tables 1 to 9. When glycolic acid is contained in the chemical conversion treatment liquid (Tables 4 to 6), the calculated values on the left side of Expression (2A) are listed in the tables in addition to the calculated values on the left side of Expression (2).

As listed in Tables 1 to 9, when glycolic acid was not contained, by satisfying Expressions (1), (2), and (3), while when glycolic acid was contained, by satisfying Expressions (1), (2A), and (3), results were obtained that the properties of the chemical conversion treatment liquids were good and the 5% white rust occurrence time of the obtained chemical conversion films was 350 hours or more. Moreover, as listed for Sample No. 1-2, etc., it has been confirmed that the chemical conversion treatment liquid may contain an aluminum component or a nickel component.

On the other hand, as listed for Sample No. 1-13 in Table 2, when a titanium component was not contained, a chemical conversion film having excellent corrosion resistance was not able to be obtained. Moreover, as listed in Tables 4 to 6, it has been confirmed that when the glycolic acid component is contained in a relatively large amount in comparison with the lactic acid component and Expression (2A) cannot be satisfied, at least one of unstable properties of the chemical conversion treatment liquids and poor corrosion resistance of the chemical conversion films occurs. As listed in Table 7, it has been confirmed that when the content of the lactic acid component is relatively large in comparison with the content of the titanium component and Expression (3) is no longer satisfied, the corrosion resistance of the chemical conversion films is deteriorated.

Example 2

The chemical conversion treatment liquids listed in Tables 10 to 12 were prepared using pure water as the solvent. The obtained chemical conversion treatment liquids were evaluated in the same manner as in Example 1, and the results are listed in Tables 10 and 11.

TABLE 10

| | 12-1 | 12-2 | 12-3 | 12-4 | 12-5 |
|---|---|---|---|---|---|
| Chromium chloride | 0.05 | 0.05 | 0.05 | 0.05 | 0.05 |
| Lactic acid | 0.109 | 0.105 | 0.103 | 0.1 | 0.1 |
| Oxalic acid | 0.011 | 0.016 | 0.018 | 0.02 | 0 |
| Malic acid | 0 | 0 | 0 | 0 | 0 |
| Citric acid | 0 | 0 | 0 | 0 | 0 |
| Glycolic acid | 0 | 0 | 0 | 0 | 0.02 |
| Titanium chloride | 0.07 | 0.07 | 0.07 | 0.07 | 0.07 |
| Sodium nitrate | 0.06 | 0.06 | 0.06 | 0.06 | 0.06 |
| Aluminum nitrate | 0.01 | 0.01 | 0.01 | 0.01 | 0.01 |
| CTI/CCr | 1.40 | 1.40 | 1.40 | 1.40 | 1.40 |
| CLc/(CTi + CCr) | 0.91 | 0.88 | 0.86 | 0.83 | 0.83 |
| (CLc − αCGy)/(CTi + CCr) | 0.91 | 0.88 | 0.86 | 0.83 | 0.77 |
| CLc/CTi | 1.56 | 1.50 | 1.47 | 1.43 | 1.43 |
| CCa/CLc | 0.10 | 0.15 | 0.175 | 0.20 | 0.00 |
| Treatment pH | 3 | 3 | 3 | 3 | 3 |
| 5% white rust occurrence time | 576 | 504 | 576 | 576 | 480 |
| Properties of treatment liquid (precipitation) | ○ | ○ | ○ | x | ○ |
| Note | Example of Present Invention | Example of Present Invention | Example of Present Invention | Comparative Example | Example of Present Invention |

TABLE 11

| | 12-6 | 12-7 | 12-8 | 12-9 | 12-10 |
|---|---|---|---|---|---|
| Chromium chloride | 0.05 | 0.05 | 0.05 | 0.05 | 0.05 |
| Lactic acid | 0.075 | 0.065 | 0.1 | 0.109 | 0.105 |
| Oxalic acid | 0 | 0 | 0.01 | 0 | 0 |
| Malic acid | 0 | 0 | 0 | 0.011 | 0.016 |
| Citric acid | 0 | 0 | 0 | 0 | 0 |

TABLE 11-continued

|  | 12-6 | 12-7 | 12-8 | 12-9 | 12-10 |
|---|---|---|---|---|---|
| Glycolic acid | 0.045 | 0.055 | 0.01 | 0 | 0 |
| Titanium chloride | 0.07 | 0.07 | 0.07 | 0.07 | 0.07 |
| Sodium nitrate | 0.06 | 0.06 | 0.06 | 0.06 | 0.06 |
| Aluminum nitrate | 0.01 | 0.01 | 0.01 | 0.01 | 0.01 |
| CTi/CCr | 1.40 | 1.40 | 1.40 | 1.40 | 1.40 |
| CLc/(CTi + CCr) | 0.63 | 0.54 | 0.83 | 0.91 | 0.88 |
| (CLc − αCGy)/(CTi + CCr) | 0.48 | 0.36 | 0.80 | 0.91 | 0.88 |
| CLc/CTi | 1.07 | 0.93 | 1.43 | 1.56 | 1.50 |
| CCa/CLc | 0.00 | 0.00 | 0.100 | 0.10 | 0.15 |
| Treatment pH | 3 | 3 | 3 | 3 | 3 |
| 5% white rust occurrence time | 480 | 432 | 480 | 432 | 480 |
| Properties of treatment liquid (precipitation) | ○ | × | ○ | ○ | ○ |
| Note | Example of Present Invention | Comparative Example | Example of Present Invention | Example of Present Invention | Example of Present Invention |

TABLE 12

|  | 12-11 | 12-12 | 12-13 | 12-14 | 12-15 | 12-16 |
|---|---|---|---|---|---|---|
| Chromium chloride | 0.05 | 0.05 | 0.05 | 0.05 | 0.05 | 0.05 |
| Lactic acid | 0.103 | 0.1 | 0.109 | 0.105 | 0.103 | 0.1 |
| Oxalic acid | 0 | 0 | 0 | 0 | 0 | 0 |
| Malic acid | 0.018 | 0.02 | 0 | 0 | 0 | 0 |
| Citric acid | 0 | 0 | 0.011 | 0.016 | 0.018 | 0.02 |
| Glycolic acid | 0 | 0 | 0 | 0 | 0 | 0 |
| Titanium chloride | 0.07 | 0.07 | 0.07 | 0.07 | 0.07 | 0.07 |
| Sodium nitrate | 0.06 | 0.06 | 0.06 | 0.06 | 0.06 | 0.06 |
| Aluminum nitrate | 0.01 | 0.01 | 0.01 | 0.01 | 0.01 | 0.01 |
| CTi/CCr | 1.40 | 1.40 | 1.40 | 1.40 | 1.40 | 1.40 |
| CLc/(CTi + CCr) | 0.86 | 0.83 | 0.91 | 0.88 | 0.86 | 0.83 |
| (CLc − αCGy)/(CTi + CCr) | 0.86 | 0.83 | 0.91 | 0.88 | 0.86 | 0.83 |
| CLc/CTi | 1.47 | 1.43 | 1.56 | 1.50 | 1.47 | 1.43 |
| CCa/CLc | 0.175 | 0.20 | 0.10 | 0.15 | 0.175 | 0.20 |
| Treatment pH | 3 | 3 | 3 | 3 | 3 | 3 |
| 5% white rust occurrence time | 432 | 432 | 480 | 480 | 432 | 432 |
| Properties of treatment liquid (precipitation) | ○ | × | ○ | ○ | ○ | × |
| Note | Example of Present Invention | Comparative Example | Example of Present Invention | Example of Present Invention | Example of Present Invention | Comparative Example |

As listed in Tables 10 to 12, provided that the water-soluble ineffective organic acid-containing substance was contained, when the above Expression (4) was satisfied, precipitation did not occur in the chemical conversion treatment liquids and the liquid stability was able to be ensured. When the above Expression (4A) was satisfied, the deterioration in the liquid stability was able to be suppressed more stably, and when the above Expression (4B) was satisfied, the deterioration in the liquid stability was able to be suppressed particularly stably.

The invention claimed is:

1. A chemical conversion treatment liquid that is cobalt-free and comprises: a water-soluble trivalent chromium-containing substance; a water-soluble titanium-containing substance; and a water-soluble lactic acid-containing substance, the chemical conversion treatment liquid optionally comprising a first water-soluble organic acid-containing substance, or a second water-soluble organic acid-containing substance, or a combination thereof, the first water-soluble organic acid-containing substance being a water-soluble glycolic acid-containing substance, the second water-soluble organic acid-containing substance being a water-soluble organic acid-containing substance based on an organic acid other than lactic acid and other than glycolic acid, wherein (I) when the chemical conversion treatment liquid does not contain the first water-soluble organic acid-containing substance and does not contain the second water-soluble organic acid-containing substance, a titanium-equivalent molar concentration CTi of the water-soluble titanium-containing substance, a chromium-equivalent molar concentration CCr of the water-soluble trivalent chromium-containing substance, and a lactic acid-equivalent molar concentration CLc of the water-soluble lactic acid-containing substance satisfy following Expressions (1), (2), and (3):

$$CTi/CCr \geq 0.5 \quad (1);$$

$$CLc/(CTi+CCr) \geq 0.40 \quad (2); \text{ and}$$

$$CLc/CTi \leq 2.6 \quad (3),$$

wherein (II) when the chemical conversion treatment liquid contains the first water-soluble organic acid-containing substance and does not contain the second water-soluble organic acid-containing substance, the above Expressions (1) and (3) and a following Expression (2A) are satisfied:

$$(CLc - \alpha \times CGy)/(CTi + CCr) \geq 0.40 \quad (2A),$$

where CGy represents a glycolic acid-equivalent molar concentration of the first water-soluble organic acid-containing substance and α represents a correction coefficient of 0.4, wherein (III) when the chemical conversion treatment liquid does not contain the first water-soluble organic acid-containing substance and contains the second water-soluble organic acid-containing substance, the above Expressions (1), (2), and (3) and a following Expression (4) are satisfied:

$$0 < CCa/CLc \leq 0.175 \quad (4)$$

where CCa represents an organic acid-equivalent molar concentration of the second water-soluble organic acid-containing substance, wherein (IV) when the chemical conversion treatment liquid contains the water-soluble organic acid-containing substance and contains the second water-soluble organic acid-containing substance, the above Expressions (1), (2A), (3), and (4) are satisfied.

2. The chemical conversion treatment liquid according to claim 1, further containing one or more materials selected from a group consisting of a water-soluble aluminum-containing substance, a water-soluble nickel-containing substance, a water-soluble magnesium-containing substance, and water-dispersible silica.

3. The chemical conversion treatment liquid according to claim 1, wherein the organic acid of the second water-soluble organic acid-containing substance includes one or more materials selected from a group consisting of oxalic acid, malic acid, and citric acid.

4. A production method for a member having a surface provided with a chemical conversion film, the production method comprising:

contacting the chemical conversion treatment liquid according to claim 1 with a base material having a metal-based surface so as to form a chemical conversion film on the metal-based surface of the base material; and washing the base material subjected to the contacting with the chemical conversion treatment liquid so as to obtain a member having a surface provided with the chemical conversion film.

5. The production method for the member according to claim 4, wherein the metal-based surface includes a surface of a zinc-based plating film.

* * * * *